Dec. 1, 1931.  P. B. CAMP  1,834,575
BRAKE ADJUSTER
Original Filed Nov. 14, 1928   2 Sheets-Sheet 1
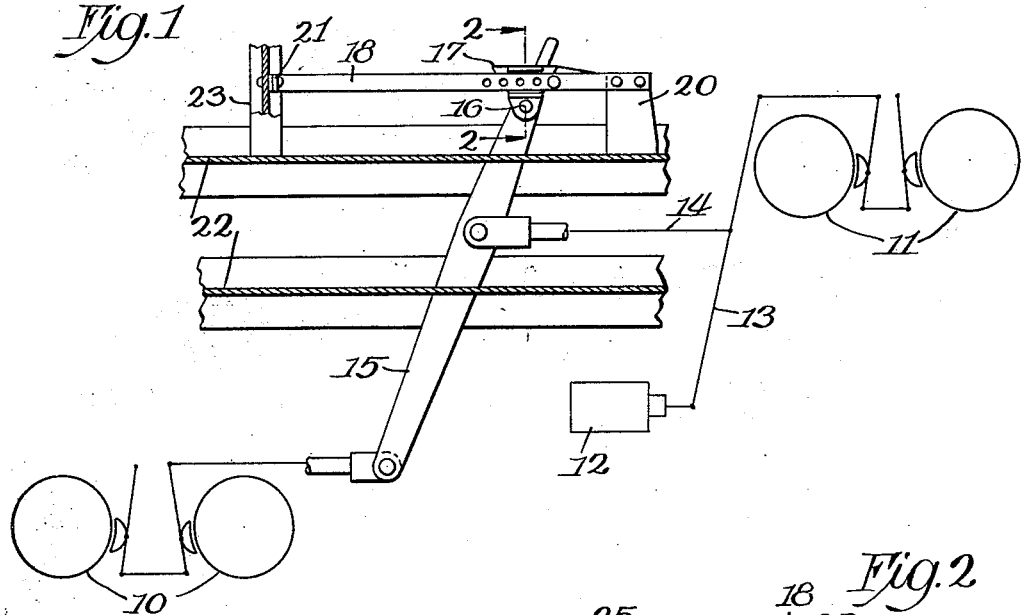
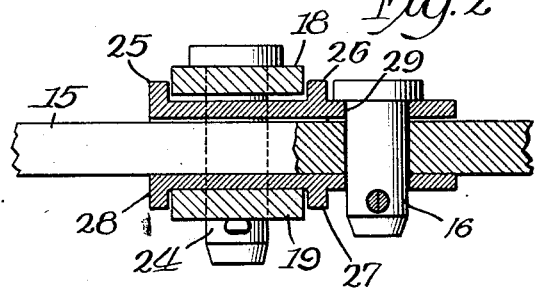
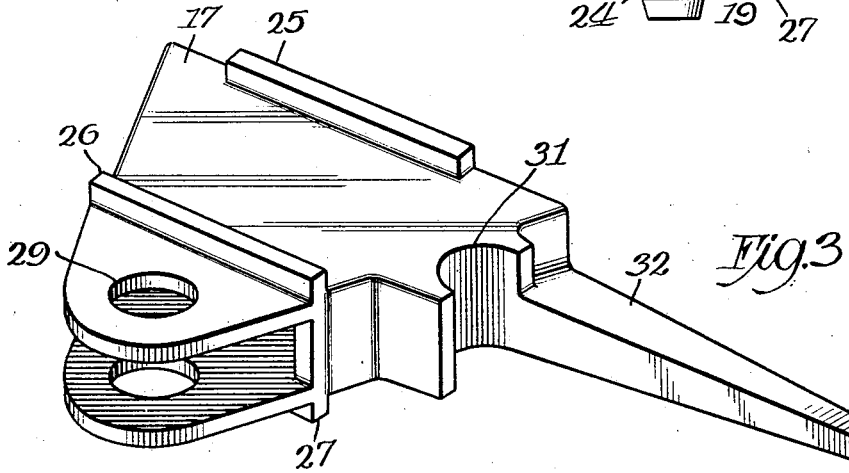
Inventor:
Percy B. Camp
By Gilson, Mann & Co. Attys.

Dec. 1, 1931.                P. B. CAMP                1,834,575
                            BRAKE ADJUSTER
              Original Filed Nov. 14, 1928    2 Sheets-Sheet 2
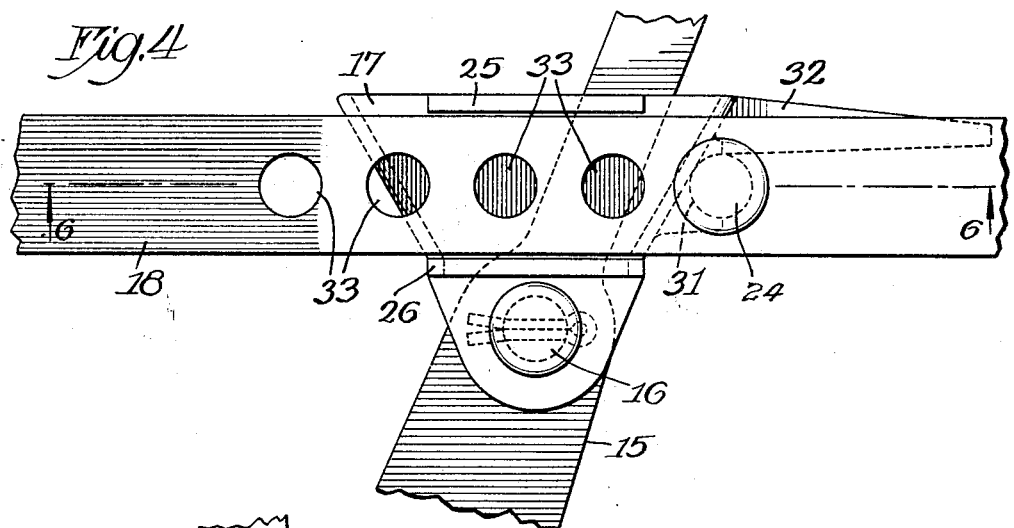
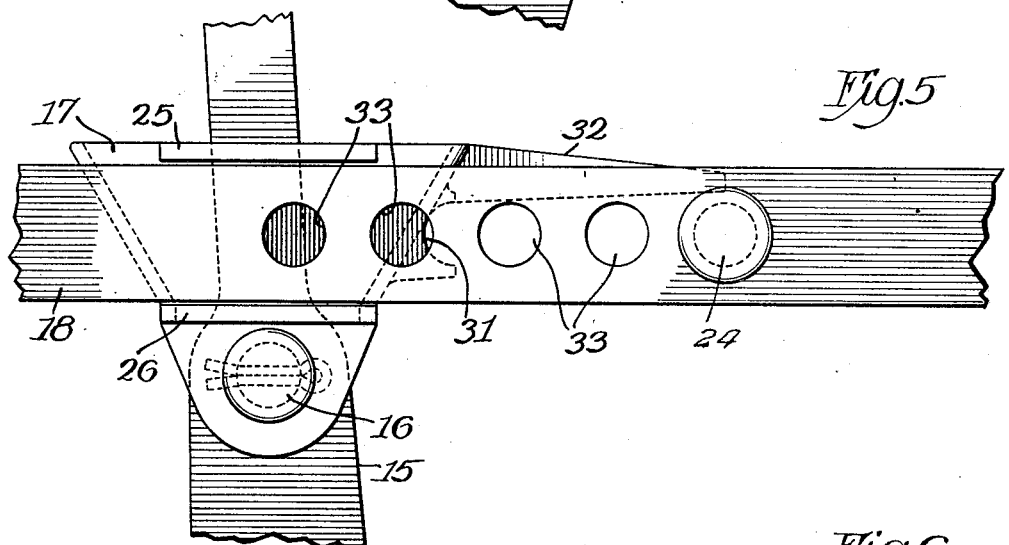
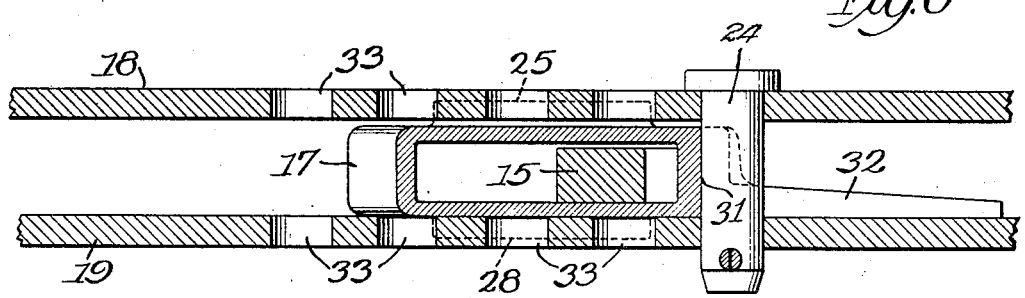
Inventor:
Percy B. Camp
By Gilson, Mann & Co.
Attys.

Patented Dec. 1, 1931

1,834,575

UNITED STATES PATENT OFFICE

PERCY B. CAMP, OF MAYWOOD, ILLINOIS, ASSIGNOR TO UNIVERSAL DRAFT GEAR ATTACHMENT CO., A CORPORATION OF ILLINOIS

BRAKE ADJUSTER

Application filed November 14, 1928, Serial No. 319,316. Renewed June 16, 1930.

The invention relates to brake mechanism of railway cars, its objects being to provide simple and efficient means for gauging the slack in the brake system and for readjusting the fulcrum of a dead cylinder lever of the mechanism to take up excessive slack which may be created by the wear of the parts, particularly the faces of the brake shoes.

One embodiment of the invention is illustrated in the accompanying drawings in which Fig. 1 is a diagrammatic representation of the brake system to which the invention is applied;

Fig. 2 is a detail section on the line 2—2 of Fig. 1;

Fig. 3 is a view in perspective of the fulcrum block for the dead lever;

Fig. 4 is a detail in plan of the lever; the fulcrum block and the support therefor, the parts being shown in normal position;

Fig. 5 is a similar view showing the position the parts assume engaging the slack and readjusting the brake; and Fig. 6 is a detail section on the line 6—6 of Fig. 4.

In Fig. 1, there are shown two pairs of car wheels 10, 11 for trucks at opposite ends of the car; an air brake cylinder is indicated at 12, its piston being connected with a live lever 13 which actuates the brakes applied to the wheels 11; and a pull rod 14 connects the lever 13 intermediate of its ends, with the dead cylinder lever 15 which serves to apply the brakes to wheels 10. The dead cylinder lever is pivoted at 16 to a fulcrum block 17 mounted upon bars 18, 19, (Fig. 2), fixed to the car frame as by means of brackets 20, 21 secured respectively to a car sill 22 and a cross beam 23, the fulcrum block engaging an abutment 24 fixed in the bars 18, 19 and being thereby held against movement in the direction in which it is urged by brake application force.

The fulcrum block 17 is shown as triangular in form and is slidably mounted between the bars 18, 19, being held in engagement therewith by upstanding and depending flanges 25, 26 and 27, 28.

This block is horizontally chambered to receive the lever 15 and permit its swinging movement, and is vertically apertured, as shown at 29, to receive the pivot bolt 16 which forms the fulcrum of the lever. The front end of the fulcrum block is recessed as shown at 31 to engage the abutment bolt 24. A gauge finger 32 projects forwardly from the fulcrum block at one side of the recess 31, the length of this finger corresponding with the normal slack of the brake system. As this slack may not be uniform in all cars or in all brake systems, the finger may be made of sufficient length to correspond with the maximum normal slack and may be cut to proper length when applied to cars in which a less amount of slack exists.

When by reason of wear, the brake slack is increased beyond normal, adjustment may be accomplished by manually swinging the pivoted end of the lever to the left, as the parts are represented in the drawings, the fulcrum block 17 being carried with it away from the abutment 24. This movement of the lever applies the brake shoes to the wheels and the abutment bolt 24 is now shifted to the hole in the bars 18, 19 with which the finger 32 most nearly registers. The fulcrum block is now permitted to return into engagement with the abutment and the extent of this movement corresponds with normal brake clearance.

While the adjusting mechanism is shown as associated with the dead cylinder lever, it may obviously be associated with any appropriate lever of the brake system. The invention, in its broader aspects, is not herein claimed, such claim being made in a copending application filed September 13, 1928, and bearing Serial No. 305,765. In the copending application, the abutment element consists of a buttress associated with a relatively fixed rack bar and adjustable thereon to form a positive stop for the fulcrum of the lever in one direction.

I claim as my invention:

1. A brake adjusting device comprising a fixed bar having a longitudinal series of apertures, a fulcrum block slidable upon the bar and having a bearing face for engaging an abutment, a finger projecting from the block adjacent its bearing face and corresponding in length to the normal brake slack, and an abutment bolt engageable with the several apertures of the series.

2. A brake adjusting device comprising a pair of parallel fixed bars having a longitudinal series of registering apertures, a fulcrum block slidably mounted between the bars and having a bearing face for engaging an abutment, a finger projecting from the block adjacent its bearing face and corresponding in length with the normal brake slack, and an abutment bolt engageable with registering apertures of the two series.

3. In a foundation brake gear, including a dead cylinder lever, the combination of a fulcrum for said lever shiftable freely at all times in one direction a distance corresponding to total brake shoe clearance, a relatively fixed guide for the fulcrum having a plurality of holes therein, an abutment element engageable with one of the holes limiting movement of the fulcrum in the opposite direction, and a gauge finger associated with the fulcrum to indicate in which hole the abutment element should be placed in order to secure normal brake shoe clearance.

4. In a foundation brake gear, the combination of a brake lever fulcrum member shiftable freely at all times in one direction a distance corresponding to total brake shoe clearance without performing any take-up action, a relatively fixed member associated with the fulcrum, one of said members having a plurality of holes therein, means on the other member for indicating the appropriate hole for the element in order to secure normal brake shoe clearance, an abutment element adapted to pass through one of said holes to limit movement of the fulcrum member in the other direction.

5. In a foundation brake gear including a brake lever, the combination of a fulcrum member for the lever shiftable freely at all times in one direction a distance corresponding to total brake shoe clearance without performing any take-up action, an apertured support for the fulcrum member, an abutment element adapted to limit movement of the fulcrum element in the reverse direction and gauge means carried by the fulcrum element for indicating the appropriate aperture about which the lever should be fulcrumed, in order to secure normal brake shoe clearance.

In testimony whereof I affix my signature.

PERCY B. CAMP.